Jan. 18, 1944.     E. H. GODFREY     2,339,262
SLEEVE VALVE AND ACTUATION THEREOF
Original Filed Nov. 8, 1938    2 Sheets-Sheet 1
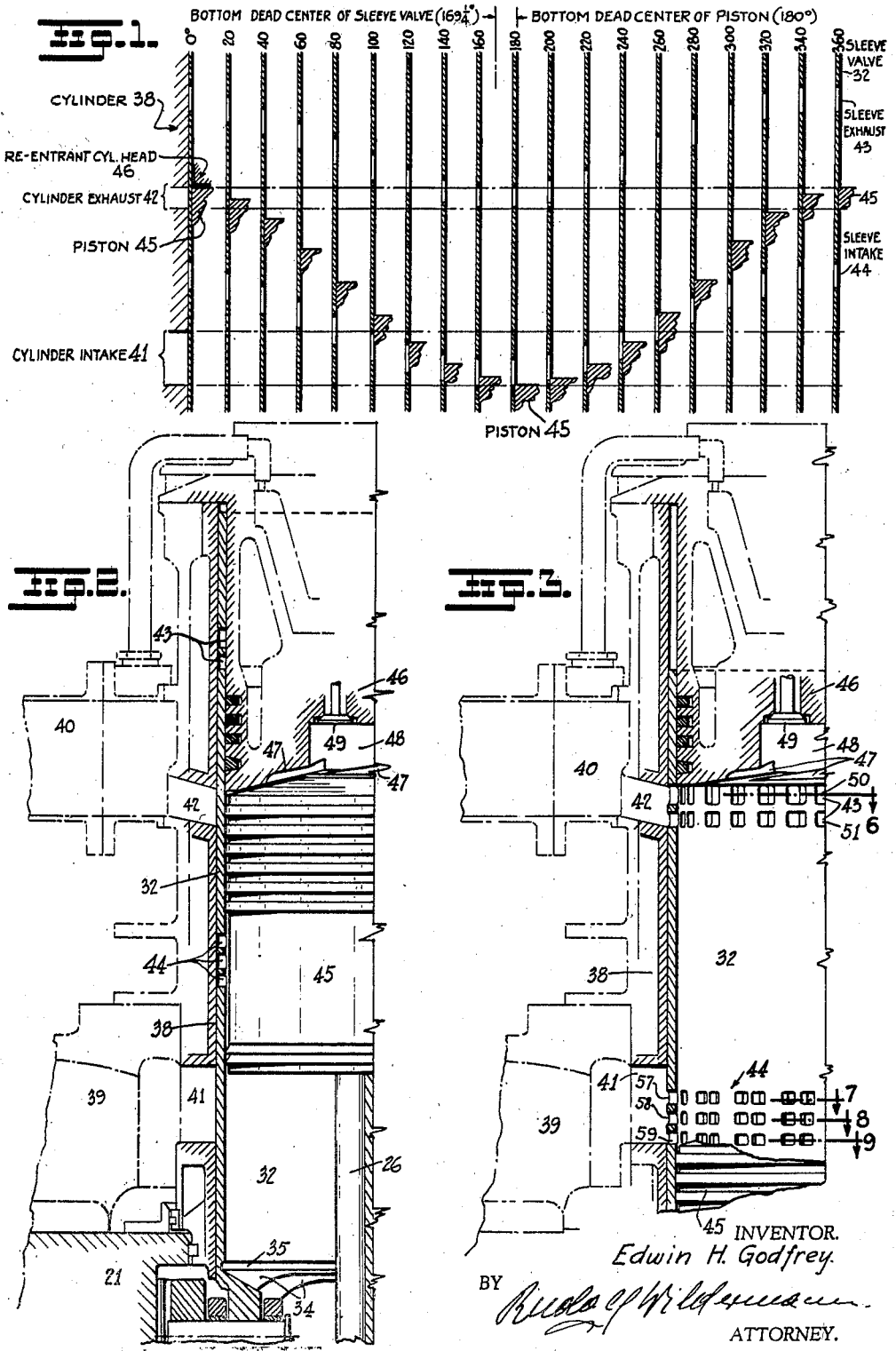
INVENTOR.
Edwin H. Godfrey.
BY
ATTORNEY.

Jan. 18, 1944. E. H. GODFREY 2,339,262
SLEEVE VALVE AND ACTUATION THEREOF
Original Filed Nov. 8, 1938 2 Sheets-Sheet 2
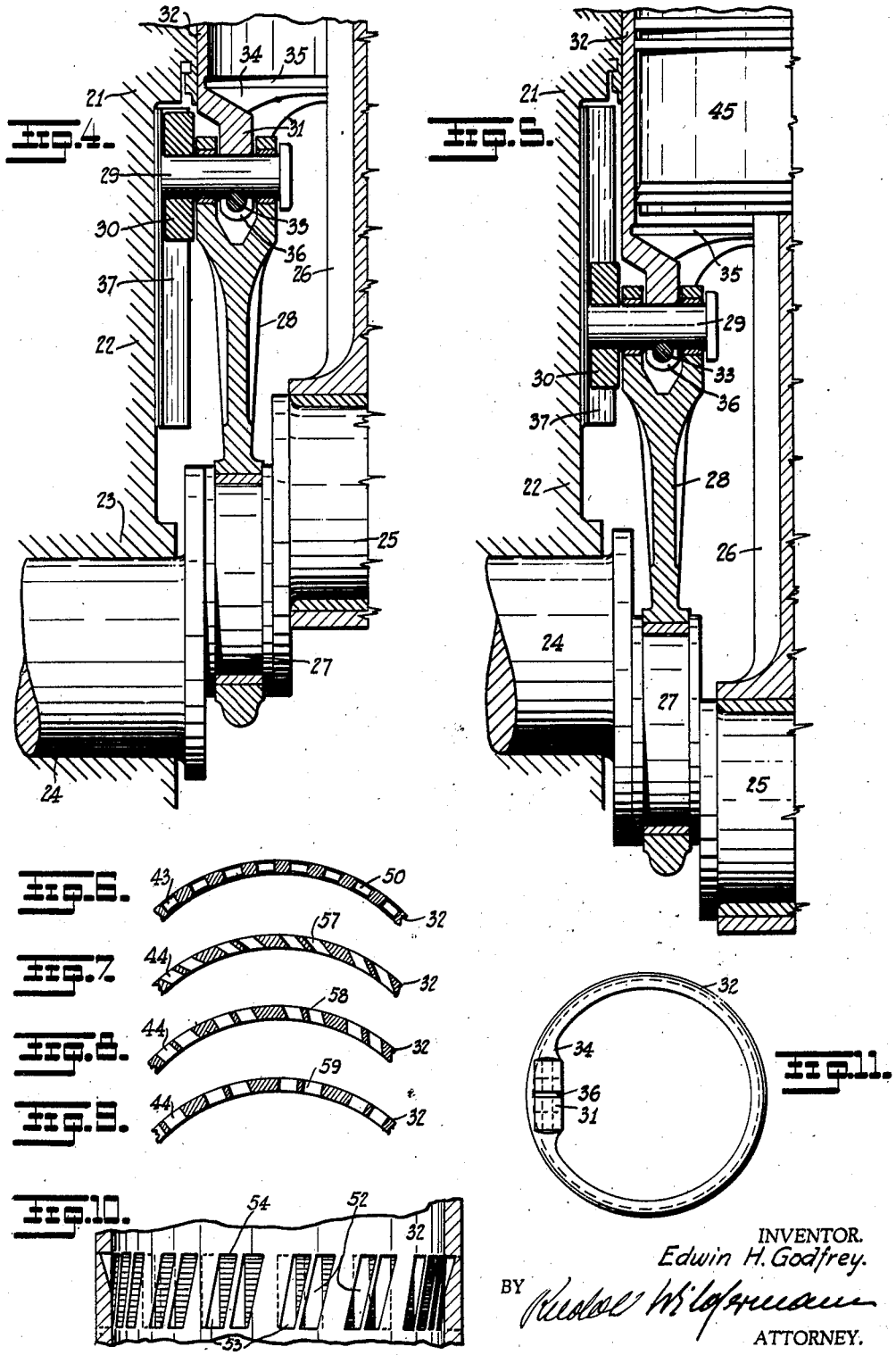
INVENTOR.
Edwin H. Godfrey.
BY
ATTORNEY.

Patented Jan. 18, 1944

2,339,262

UNITED STATES PATENT OFFICE 2,339,262

SLEEVE VALVE AND ACTUATION THEREOF

Edwin H. Godfrey, Wenonah, N. J., assignor to Atlantic Diesel Corporation, New Brunswick, N. J., a corporation of New Jersey Original application November 8, 1938, Serial No. 239,429. Divided and this application May 4, 1940, Serial No. 333,289

2 Claims. (Cl. 123—65)

This invention is a division of my application Serial No. 239,429, entitled Internal combustion engine and filed on November 8, 1938. It concerns the sleeve valve of a two cycle engine, its actuation, the form of the ports, and their relation to each other, to the ports in the cylinder, and to the piston in the relative movement of these parts.

Some of the improvements taught herein concern engines in which a comparatively high efficiency is to be coordinated with the particular object of a high ratio between power output and volumetric capacity, so as to reduce the measurements and weight of an engine for a great power output. Various features of this invention are explained in particular reference to two-stroke cycle engines. Then again certain features of this invention depend on supercharging, and others are treated in relation to solid injection engines, where fuel and air are separately introduced into the combustion chamber, and where these features show to best advantage. However, as a result of an analysis of the objects of this invention, and of the instant detailed description of the features by which those objects are obtained in connection with particular kinds of engines, those features may be selectively applied by the experienced engineer to diverse other types of engines.

In developing compact high power internal combustion engines the builder frequently places particular emphasis on free flow of the gases into and out of the combustion chamber, a good scavenging serving to remove burnt gas as much as possible, or high turbulence for the purpose of thoroughly mixing air with the fuel before combustion. But in many respects these objects are at variance with each other, so that frequently conditions ideal for any one of these objects are inimical to the attainment of one or both of the others, thus resulting in a poor overall efficiency. In the pursuit of these and other objects which are necessary for good engine performance, this invention tries in particular to coordinate these objects, so that none of them operates to the detriment of the others. Thus scavenging and turbulence are to be rendered complementary to each other by features claimed herein, and in their combination with other features explained and claimed in copending applications Serial No. 239,429, Serial No. 333,290 and Serial No. 333,291.

On the other hand the objects of this invention also concern the pure mechanics of sleeve valve construction, control and actuation, bearing in mind that in an engine having a high output and operating at a high speed the parts must be shaped and arranged to reduce unbalancing and stressing thereof to a minimum, and to reduce the number of the parts, to simplify them and to render them rugged, all for the purpose of dependable operation and life of the engine.

Other objects of this invention will be explained in connection with the following description and appended drawings of one embodiment of the invention and some modifications thereof, such explanation being however given for purposes of illustration only, and not in limitation of the scope of this invention.

Fig. 1 is a diagrammatic chart of the working parts of a two-stroke cycle sleeve engine passing through one complete cycle from top dead center to top dead center position of the piston and showing the left top corner of the piston at 10° steps of such cycle in relation to the moving sleeve valve as it shows in section adjacent to said left top corner of the piston, and to a section of the adjacent wall of the stationary cylinder with the cylinder head and the exhaust and intake ports.

Fig. 2 shows, by way of half a cross-section of one cylinder of an internal combustion engine in the top center position of the piston, the engine parts herein particularly involved, the drawing being supplemented by a dot-dash outline of the surrounding parts of the engine.

Fig. 3 shows a corresponding view of the same embodiment of the invention, the piston being in a bottom dead center position.

Figs. 4 and 5 are corresponding views, which are supplementary, respectively, to the showings of Figs. 2 and 3, and show the gearing accommodated in a portion of the crankcase.

Figs. 6, 7, 8 and 9 are segmental, horizontal sections of a sleeve valve, and extend through the exhaust port and each of the three rows of the intake port, respectively, as indicated by dot-dash lines, arrows and the corresponding numerals in the view of Fig. 3.

Fig. 10 is a fragmentary interior view of the wall of a sleeve valve and comprises, in particular, a sector modified concerning the intake port.

Fig. 11 is a bottom view of a sleeve valve as embodied in the other figures.

Similar numerals refer to similar parts throughout the various views:

The crankshaft bearing 23 is supported in the crank casing 21 by an end wall, partition or riser 22. Crankshaft 24 has a throw 25 for the piston connecting rod 26 and a throw 27 for the valve connecting rod 28, said throws being differently eccentric and also angularly offset relatively to each other; for instance, the valve throw is 10.25° angularly ahead of the piston throw in the embodiment herein illustrated and charted in Fig. 1. In the case of a radial engine the piston connecting rods 26 may of course be combined on a king strap engaged upon the throw 25, as known in this art, and we may in that case have an analogous arrangement for the valve connecting rods 28.

The upper, bifurcated end of valve connecting rod 28 is rotatively engaged upon a pin 29 upon opposite sides of the lug 31 which forms part of and depends from sleeve valve 32, the pin 29 being fixedly clamped onto the lug 31 by the clamping bolt 33. That bolt extends across the lower end of lug 31, which is split by slot 36. A crescent, conical contraction 34 is provided in sleeve valve 32 below the clearance groove 35, and is a web securing lug 31 underneath the sleeve valve 32 in a position, where it is offset towards the center from the periphery of the sleeve valve 32.

Pin 29 carries at its outer end a slide 30, which is vertically reciprocatably accommodated in a track 37 provided upon riser or wall 22.

The jacketed cylinder 38 arises from the crankcasing 21 and is surrounded at spaced levels by a manifold 39 for the supply of an air and gas mixture of air from a supercharger, and by an exhaust manifold 40, which open upon the inside of the cylinder from all sides by way of the cylinder intake port 41 and the cylinder exhaust port 42, respectively.

The sleeve valve 32 is slidably accommodated upon the inside of cylinder 38, and in the sleeve valve the piston 45. The top of piston 45 substantially registers in the top center position with the top of port 42 and in the bottom center position with the bottom of cylinder intake port 41. In the bottom position of sleeve valve 32 its exhaust port 43 registers with the cylinder intake port 41. However, only the bottoms of the intake ports of the sleeve valve and of the cylinder register with each other, because the cylinder intake port 41 is higher than the intake port 44 of the sleeve valve.

The re-entrant head 46 hangs down from the upper end of the cylinder into the sleeve valve 32 and is marginally substantially in buttwise registration with the top of the piston 45, when the latter is in its top center position, except that either the piston top or the bottom of the re-entrant head may be marginally provided with helico-spiral grooves, as they are indicated at 47 at the bottom of the re-entrant head 46. These spiral grooves are more particularly described in my companion application Serial No. 333,291, and it is sufficient here to state that such spiral grooves 47 enlarge towards the center of the cylinder, where they open onto the central recess 48 in the bottom of the re-entrant head 46. Recess 48 serves as an explosion chamber, and a nozzle 49 is shown to open into it and will supply a jet of fuel, when the engine is of the solid injection type. Unless the engine is of the Diesel type, a means for ignition, for instance a spark plug is arranged in the explosion chamber 48, such means being not shown.

If the intake ports are directed at an angle into the combustion chamber, so that the charge driven ahead of the ascending piston whirls in a particular sense, then the spiral grooves 47 should be disposed towards the center in a corresponding sense, so that these grooves 47 impart to the whirling charge a final swirl in the same direction. When it is squeezed out from between the marginal portions of the top of the piston and the bottom of the re-entrant cylinder head into the recess or explosion chamber 48.

In order to provide the desired structural strength of the sleeve valve, the sleeve valve exhaust port 43 may be subdivided by vertical and horizontal webs. Thus two rows 50 and 51 of holes are shown, for instance in Fig. 3. Fig. 6 is a cross-section of one of these rows of sleeve valve exhaust port holes.

The sleeve valve intake port 44 is similarly subdivided into three rows 57, 58, 59 of holes, which may for instance be narrowly spaced in pairs, and wider and therefore stronger portions of sleeve material extend between pairs.

Like the holes of the rows of the exhaust port of the sleeve valve, the holes of row 59 of the sleeve intake 44 are directed substantially towards the center of the sleeve valve. But the holes of the next row 58 above are shown to be at an incline, all holes of this row being substantially disposed at the same angle in respect to planes extended from these holes through the center line of the cylinder and valve, as illustrated in Fig. 8. The holes of the top row 57 are inclined at a still greater angle (Fig. 7), so that they impart the greatest tangential or whirling momentum to the charge passing therethrough from the cylinder intake port 41 into the combustion chamber. Less momentum of that kind is imparted to the charge by the holes of the row 58, and no whirling momentum at all by the row 59, with the following results:

It has been considered good practice to provide slanted intake openings for the charge, so that the resulting turbulence will cause a good mixing of the fuel and air contained in the charge, or of the air with the subsequently introduced fuel, when the charge consists of air only. In the latter case a turbulent whirl of air will help in disrupting, evaporating and diffusing the fuel injected thereinto.

However it has also been observed—and has led to this invention—that a charge, which is thus tangentially propelled into the combustion chamber, will centrifugally follow and cling to the wall of the cylinder or sleeve valve, virtually form an annulus around a substantially stationary core of the burnt gases in the center of the combustion chamber, and prevents these burnt gases from being exhausted, thus hampering the scavenging. Likewise such a tangentially introduced charge hugging the wall of the cylinder or of the sleeve valve does not come into contact at all with the piston top, upon which arises a substantially undisturbed central column of unburnt gases, and the heat of the piston top is not dissipated, nor imparted to the charge, as it is desirable, on one hand for preheating the charge, and for the purpose of cooling the piston top, on the other hand.

Thus the prior art attained turbulence at the expense of scavenging, and the "tangential" introduction of the charge entails other disadvantages. These disadvantages are overcome according to this invention by introducing part of the charge at an angle, and part of it at a lesser angle or even right in the direction to the axis of the cylinder.

Figs. 2, 3, 7, 8 and 9 show a form of such an arrangement, where the blast of the charge enters at an incline, i. e., tangentially at the top and straight, i. e., centripetally at the bottom of the intake, so that the tangential introduction above results in an outer whirl, through the center of which the burnt gases are driven up by the portion of the charge entering centripetally at the bottom of the intake and sweeping right onto and over the piston top. If now the registration and relative change of the cylinder intake port and the sleeve valve intake port are used for control of the introduction of the charge, the bottom row 59 of straight holes is laid bare first; then these lower holes and those of the tangential upper rows 58 and 57 respectively admit scavenging and whirling portions of the charge at the same time, when the cylinder and sleeve ports register; and before closing of the intake port there remains again, as at the beginning, the centripetal charge only. But in the arrangement shown, see particularly Fig. 1, the order of charging is reversed, i. e., we start and wind up with a tangential blast, and the centripetal scavenging blast is only introduced around and after the time of full registration of the cylinder and sleeve valve intake ports. This is brought about by the overlapping control exercised by the piston, which first clears and last closes over the row 57 of holes of the sleeve valve intake, which are most inclined. This leads to a scavenging of the piston top at the height of the intake operation only, whereas the tangential blast—serving primarily for turbulence—prevails during this period of maximum blast, where the port fully registers, but precedes and succeeds this period just as well. In such an arrangement the centripetal introduction for purposes of scavenging least interferes with the turbulence caused by the tangential charging, such turbulence being of course particularly desirable during the upward stroke of the piston of a solid injection engine, when the charge is to be intermixed with the fuel then being introduced. Hence the component action of the spiral grooves 47 in the bottom of the re-entrant head—or of such grooves on the piston top or in both places—has been found to be a valuable component for causing a final swirl of the charge when fuel is introduced thereinto and the mixture explodes.

The foregoing discourse—showing the ramifications obtainable with differently inclined rows of holes of one of the ports, and the reversal obtained by the overlapping piston action—serves to illustrate that any quantitative and chronological coordination for purposes of turbulence and scavenging can be effected by the improvements of this invention.

Instead of the provision of separate holes and separate rows of holes for directing the blast of the charge at different angles into the combustion chamber, the variously slanted holes may be interconnected. For instance for the purpose of obtaining a distribution of a blast in analogy to that obtained with an intake like that of Fig. 3, a sleeve valve intake port arrangement like that shown in Fig. 10 may be substituted, where each of the slots 52 of the sleeve valve intake changes from a radial disposition substantially normal to the surface of the sleeve at its lower end 53 to a slanted or "tangential" position at its upper end 54.

The following supplementary data on an embodiment shown facilitate understanding of the invention in connection with a review of the cycle illustrated in the chart of Fig. 1, additional departures of this arrangement being emphasized at the same time.

The sleeve ports were almost 1" high, the intake port being slightly higher than the exhaust port. The height of the cylinder exhaust port was the same as that of the sleeve valve exhaust port, whereas the cylinder exhaust port was more than 1.75" high, the cylinder having a 6" bore. The sleeve valve movement, with a 3.4375" stroke, was advanced for 10.25° relatively to a 7" piston stroke.

Solid injection is followed by explosion near the top dead center position of the piston. Evacuation of the burnt gases starts at the 103° position, where the exhaust port opens; but the piston lays the intake free at a position of 125.5° only, so that liberal time is interposed between the first release of the burnt gases and the admission of the new air charge. The exhaust port closes again at the 237° position, but because of the high intake port in the cylinder the closing of the intake is delayed until after the closing of the exhaust port, so that the pressure of the supercharged air may build up in the combustion chamber before the ascending piston shuts off the intake and further compresses the charge, into which fuel is injected again, as top dead center is being approached.

Having thus described my invention by way of different embodiments, yet I do not wish to be limited thereby, except as the state of the art and the appended claims may require, for it is obvious that various modifications and changes may be made in the form of embodiment of my invention, without departing from the spirit and scope thereof.

What I claim is:

1. An engine comprising a cylinder, a crankshaft having a pair of relatively radially and angularly spaced throws, a piston, a sleeve valve surrounding the piston within the cylinder, a pair of connecting rods connecting said crankshaft throws to said piston and to said sleeve valve, respectively, exhaust ports in said cylinder and said sleeve valve, intake ports in said cylinder, substantially level intake ports encircling said sleeve valve as holes near its lower end, and having an upper tier of substantially spirally disposed ports and a lower tier of radially disposed ports, and all registering with said cylinder intake ports and being open when the exhaust ports in said cylinder and sleeve valve register with each other at the bottom dead center position of the sleeve valve, said intake ports in said cylinder being however larger than said intake ports in said sleeve valve, so that the latter intake ports fully register with the former during a reciprocating movement of the sleeve valve even before and after the said exhaust ports pass through registering positions, said piston descending below said upper tier at the end of its downward stroke so that a radial charge then entering through said lower tier sweeps onto the center of the top of said piston, and said piston laying said upper tier bare for admission of a charge only after the exhaust ports have opened, but closing said intake ports during its ascent only after the exhaust ports have closed.

2. In a two-stroke cycle internal combustion engine having a piston and a sleeve valve surrounding said piston, the combination of a first row of intake holes in the sleeve valve which extend radially and normal to the sleeve valve axis through the sleeve valve and which are just cleared by the piston in the bottom dead center position so that the charge taken in through said holes sweeps up to said axis onto the piston top, with another row of intake holes extending through the sleeve above said first row at an incline with a plane through the sleeve valve axis and serving to centrifuge a charge taken in therethrough onto the inside of the sleeve valve, so that the last mentioned charge forms a cylinder through which the first mentioned charge may arise after having swept onto the center of the piston top.

EDWIN H. GODFREY.